United States Patent
Pous et al.

(10) Patent No.: US 8,727,476 B2
(45) Date of Patent: May 20, 2014

(54) PRINTER CALIBRATION

(75) Inventors: Jacint Humet Pous, Barcelona (ES);
Marc Serra Vall, Barcelona (ES); Jesús Garcia Maza, Barcelona (ES); Eduardo Amela Conesa, Lleida (ES); Jaime Fernandez del Rio, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 73 days.

(21) Appl. No.: 13/484,058

(22) Filed: May 30, 2012

(65) Prior Publication Data

US 2013/0321514 A1    Dec. 5, 2013

(51) Int. Cl.
*B41J 29/393* (2006.01)
*B41J 2/21* (2006.01)

(52) U.S. Cl.
CPC .............. *B41J 29/393* (2013.01); *B41J 2/2121* (2013.01)
USPC ......................................................... 347/19

(58) Field of Classification Search
CPC ...... B41F 31/045; B41J 29/393; B41J 2/2121
USPC .............. 347/9, 14, 15, 19; 358/1.9
See application file for complete search history.

(56) References Cited

U.S. PATENT DOCUMENTS

| | | | |
|---|---|---|---|
| 6,178,007 B1 | 1/2001 | Harrington | |
| 7,027,185 B2 | 4/2006 | Subirada et al. | |
| 7,869,087 B2 | 1/2011 | Wang et al. | |
| 2008/0127846 A1* | 6/2008 | Nagai | 101/365 |
| 2009/0237683 A1 | 9/2009 | Martinez et al. | |
| 2010/0201998 A1 | 8/2010 | Quach | |
| 2010/0277751 A1 | 11/2010 | Quach | |

OTHER PUBLICATIONS

Emmel, P., et al., Colour Calibration for Colour Reproduction, ISCAS 2000—IEEE International Symposium on Circuits and Systems, Ma 28-31, 2000, Geneva, Switzerland, pp. V-105-V-108.

* cited by examiner

*Primary Examiner* — An Do

(57) ABSTRACT

According to one example, there is provided a method of calibrating a printing system. The printing system is configured to supply print media and calibration media to a print zone. The method comprises controlling the printing system to position calibration media in the print zone, printing a predetermined set of color patches on the calibration media, measuring color characteristics of the printed set of color patches, and comparing the measured color characteristics with a set of reference color characteristics. The method further comprises calibrating the printing system based on the compared characteristics.

16 Claims, 5 Drawing Sheets

PRINTER CALIBRATION

BACKGROUND

In order to accurately reproduce colors, printing systems generally require color calibration. Although printing systems are generally calibrated during manufacture, they typically require periodic calibration. For example, over time changes in printing system components may lead to inaccurate color reproduction. Printer calibration may also be used to help ensure color accuracy when printing on medias that having different media characteristics.

Many printing systems are able to perform self-calibration by printing a set of color patches on a media, taking color measurements of the printed color patches with an integrated color measurement device, and comparing measured color characteristics with reference color characteristics stored in the printer. However, due to the variety of different medias that many printing systems are able to print on, accurate color calibration requires reference color characteristics to be stored for each different type of media that the printing system may be used to print on. Furthermore, it is necessary to identify to the printing system which media is being used for the color calibration, in order that the correct reference color characteristics are used.

BRIEF DESCRIPTION

Examples, or embodiments, of the invention will now be described, by way of non-limiting example only, with reference to the accompanying drawings, in which.

DETAILED DESCRIPTION

As described above, ensuring absolute color accuracy in printing systems is generally important to printing system operators. However, in many situations, color consistency between multiple printing systems may be considered more important than absolute color accuracy. For example, print shop operators who use multiple printing systems and who dispatch print jobs between different ones of their printing systems generally have to have consistent colors produced by each of their printing systems. For print shop operators, each print should ideally be indistinguishable, irrespective of which printing system was used to produce it.

As will be described below, examples of the present invention provide a system and method which enable multiple printing systems to be independently calibrated in such a way that multiple printing systems calibrated in this way produce consistent color prints.

Figure 1:
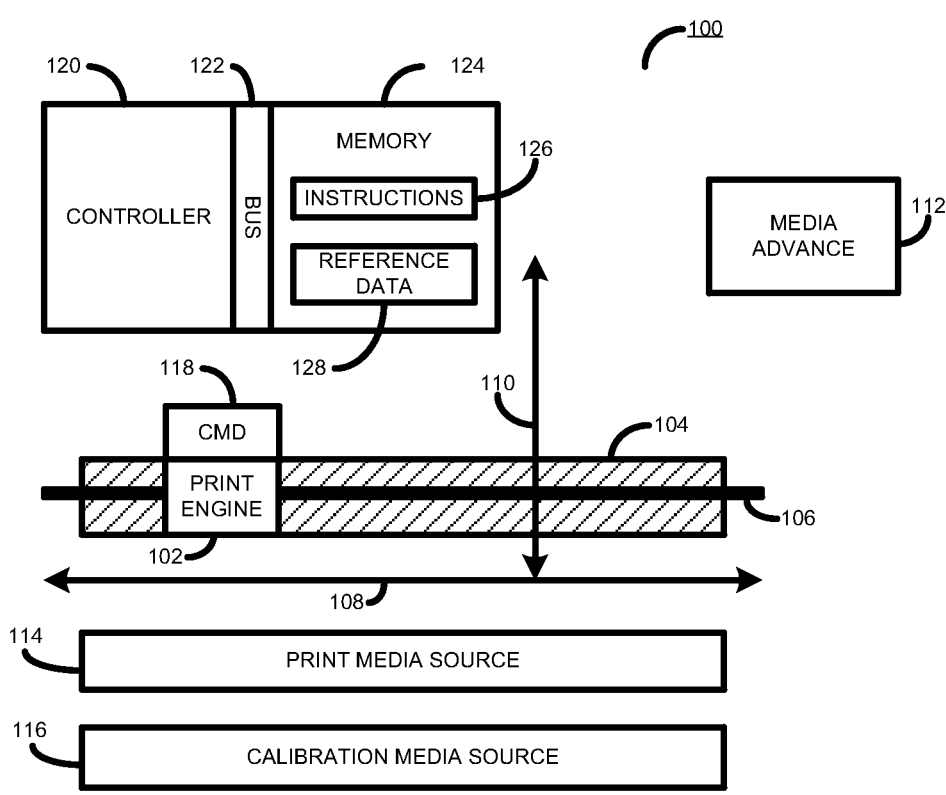
FIG. 1 is a simplified block diagram of a printing system according to one example.

Referring now to FIG. 1, there shown a simplified block diagram of a printing system 100 according to one example.

The printing system comprises a print engine 102 for creating ink marks on a media within a print zone 104. In the example shown the print engine 102 is a scanning print engine that may scan across the width of the print zone 104, along a carriage bar 106, to produce printed images in an incremental manner. The print engine 102 scans along the print zone 104 in a scanning axis 108. In one example the print engine 102 is mounted on a moveable carriage (not shown).

In one example the print engine 102 comprises one or multiple ink jet printheads operable to eject ink drops onto a media located in the print zone 104.

Once the print engine 102 has finished printing a swath in the print zone 104, the media which is being printed on is advanced along a media advance axis 110 by a media advance mechanism 112. The media advance axis is substantially perpendicular to the scanning axis 108. The amount by which the media is advanced may depend on the print mode in use.

The printing system 100 is configured to print on a variety of different media types. A print media source 114 provides print media to the print zone 104 so that images may be printed on print media. By print media is meant a media on which a specific print job or image is intended to be printed. For example, a print media may be a white paper media, a colored paper media, a plastic media, a fabric media, a transparent media, a translucent media, etc.

In one example the print media source 114 is a sheet feeder to provide individual sheets of media to the print zone 104. In a further example, the print media source 114 is a roll feeder to provide media from a roll or web of media to the print zone 104.

The printing system 100 further comprises a calibration media source 116 that selectively provides media having predetermined characteristics to the print zone 104. In this way, the calibration media 116 may be provided, for example, by a printing system manufacturer and may be manufactured to have a high level of conformity to a set of predetermined media characteristics. Such characteristics may include, for example, media color, media weight, media thickness, media gloss, media composition, etc. The calibration media should, ideally, also have very low manufacturing variability, good color consistency across the media, have substantially homogenous chemical and physical properties, and not be subject to excessive aging effects. In this way, the calibration media 116 may be considered to be a consumable element of the printing system 100.

The arrangement of the print media source 114 and the calibration media source 116 is such that the printing system 100 may selectively provide either print media or calibration media to the print zone 104.

The printing system 100 further comprises a color measurement device (CMD) 118. In one example the CMD 118 is a color sensor or color sensing device 108, such as a spectrophotometer or colorimeter. The CMD 118 measures characteristics of light received thereat. For example, measured characteristics may include the wavelength or wavelengths of received light, and the intensity of received light. If a spectrophotometer is used as the color sensing device 108, for example, it may measure the different wavelengths of received light and calculate CIE Lab or XYZ values. In one example the CMD 118 further includes a light source (not shown) to illuminate a printed color patch being measured.

In another example the color measurement device 118n may be a camera or a scanner.

The CMD 118 may be used to obtain color characteristics of ink marks printed on a media by the print engine 102.

In the present example the CMD 118 is mounted on the same carriage on which the print engine 102 is mounted, to enable the CMD 118 to obtain color characteristics along the whole width of the print zone 104. In a further example the CMD 118 is mounted on a separate carriage (not shown) that scans along a separate carriage bar (not shown).

Operation of elements of the printing system 100 is controlled by a printer controller 120. In one example the printer controller 120 is a microprocessor or microcontroller. The printer controller 120 is coupled, via a communication bus 122, to a memory 124. The memory 124 stores controller executable instructions 126 that cause the printer controller 120 to control elements of the printing system 100 as described further below. The memory 124 additionally stores reference calibration data 128. The predetermined reference data stored in the memory 124 is data that has been obtained, for example, by a printing system manufacturer, following the printing of a predetermined set of color patches on a reference calibration media having predetermined characteristics, and further following measurement of color characteristics of the printed color patches. The predetermined reference data may be stored, for example, in the memory 124 during manufacture of the printing system.

Figure 2:
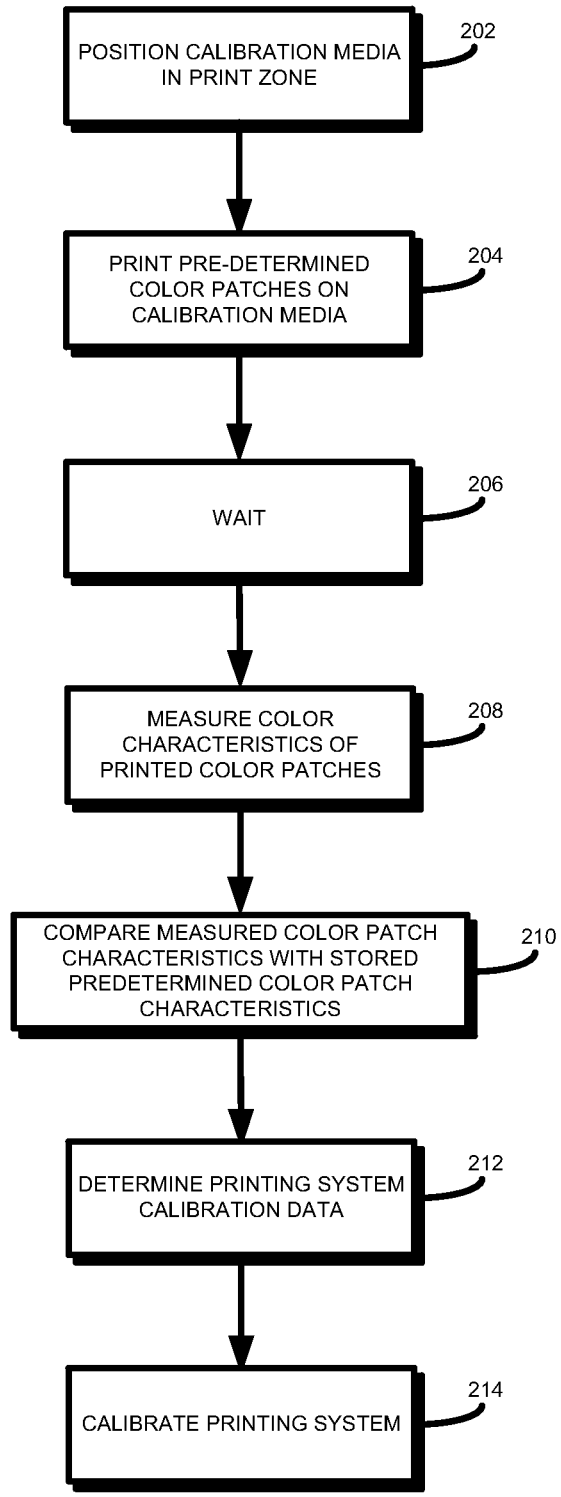
FIG. 2 is a flow diagram outlining an example method of operating elements of a printing system according to one example.

Referring now to FIG. 2, there is shown a flow diagram outlining example method steps performed by the printer controller 120, according to one example.

In the present example a determination is made to perform a color calibration of the printing system 100. This determination may, for example, be made by a printing system operator, for example as a result of the operator observing that colors are no longer being accurately produced by a printing system. The determination to perform a calibration may also be made by an operator who has multiple printing systems and who wishes to ensure that each of the printing systems exhibit color consistency between each of the multiple printing systems. This is particularly important to print shop operators who may have multiple printing systems and who dispatch printing jobs between those printing systems whilst expecting color consistency of printed jobs irrespective of the printing system that printed the job.

The determination may also be made automatically by the printing system controller 120, for example based on a routine calibration cycle, based on the number of print operations performed by the printing system 100, based on the age of the printing system 100, etc.

At block 202 the printer controller 120 controls the printing system 100 to position calibration media 116 in the print zone 104. As will be appreciated, this may be achieved in any suitable manner, for example by controlling the media advance mechanism 112 to select a sheet of media from a sheet feeder containing calibration media, and by advancing a sheet of calibration media through a media path to the print zone 104.

At block 204 the printer controller 120 controls the printing system 100 to print a set of color patches on the calibration media positioned in the print zone 104. The set of color patches may be any suitable set of color patches and may include, for example, a row of color patches per primary color ink used by the printing system 100. In each row of color patches different color density patches may be printed, for example such that at or towards one extremity of the calibration media is printed a color patch having 100% color density, and at or towards the other extremity of the calibration media is printed a color patch having 10% color density, with intermediate color patches having graduated intermediate color densities. In one example the arrangement of the color patches may be modified depending on the width of the calibration media. In any case, the printer controller 120 controls the printing system 100 to print the color patches on the calibration media in a predetermined manner.

If multiple rows of color patches are to be printed, the printer controller 202 controls the media advance mechanism to advance the calibration media 116 through the print zone 104, and to print a subsequent row of color patches.

At block 206 the printer controller 120 waits a predetermined amount of time to allow for the printed color patches to dry. Depending on the type of printing system the predetermined amount of time of may be in the range of about zero to 30 seconds.

At block 208 the printer controller 120 controls the color measurement device 118 to measure color characteristics of each of the color patches printed on the calibration media 116. The printer controller 120 may achieve this, for example, by moving the CMD 118 across the width of the print zone above a set of printed color patches, and by controlling the media advance mechanism 112 to position the calibration media in an appropriate position below the CMD 118. The printer controller 120 stores, at least temporarily, in the memory 124, the measured color characteristics for each color patch.

At block 210 the printer controller 120 performs a comparison of each of the color characteristics for each color patch with corresponding predetermined reference color data 128 stored in the memory 124.

At block 212 the printer controller 120 determines, from the comparison, printing system calibration data. In this way, if it is determined that color characteristics of a measured color patch do not correspond to stored reference color characteristics 128 the printer controller 120 may determine an adjustment or coefficient to be applied to the printing system 100.

At block 214 the printer controller 120 applies the determined calibration data to calibrate the printing system 110. In one example the determined calibration data may be used to feed a closed-loop color calibration system (not shown).

Once the printer controller 120 has calibrated the printing system 110, the printing system may resume printing or may be used again for printing print jobs or images on print media 114.

Calibrating multiple printing systems in this manner, using the calibration media having the same media characteristics as the media used to generate the reference data stored in the memory 124 enables color consistency between each of the printing systems to be achieved. Advantageously, this avoids the need to store different reference color characteristics in the memory 124 for each of the different types of print media that the printing system 100 may be used to print on.

Figure 3:
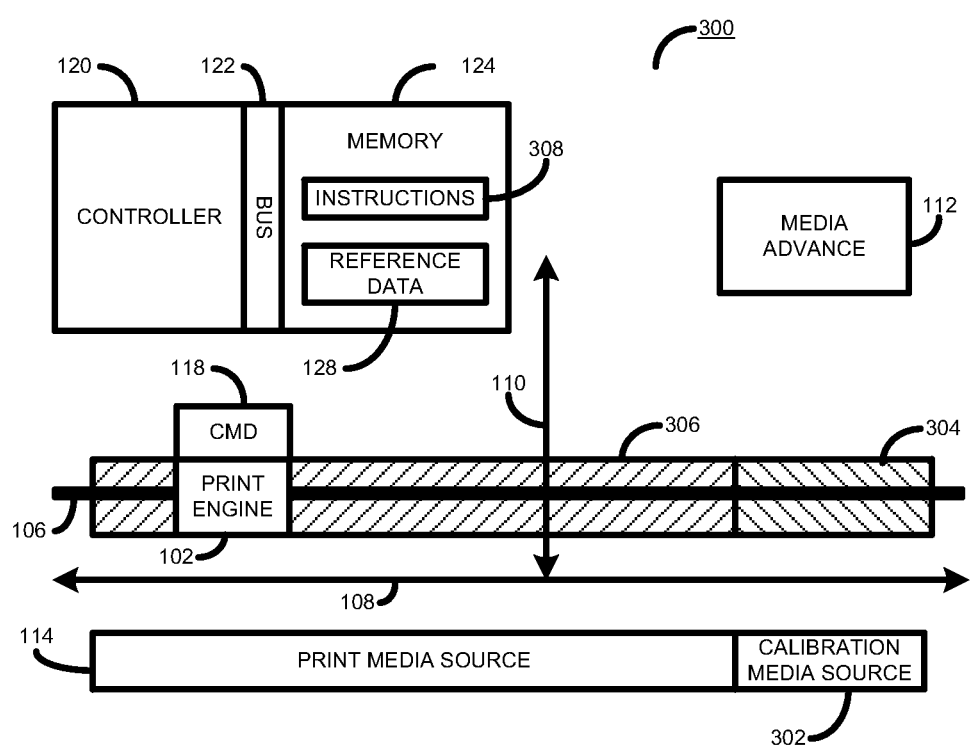
FIG. 3 is a simplified block diagram of a printing system according to one example.

Turning now to FIG. 3, there is shown a simplified block diagram of a further printing system 300 according to a further example. In this example, like or similar elements with those shown in FIG. 1 are given the same reference numerals.

The printing system 300 has, in addition to a print media print zone 306 in which ink marks may be printed on a print media 114, a calibration print zone 304. The print engine 102 and CMD 118 are configured to be moveable along the whole width of both print media print zone 306 and calibration print zone 304. In this way, the print engine 102 may print on both print media and calibration media in a single pass.

In this example, the calibration media source 302 is configured to supply calibration media to the calibration print zone 304. In one example, print media source 114 and calibration media source 302 are configured to concurrently supply their respective media to their respective print zone. For example, the print media source 114 may supply print media to the print media print zone 306 at the same time as calibration media source 302 supplies calibration media to the calibration print zone 304.

In one example separate media advance mechanisms are used to independently advance print media from the print media source 114 and calibration media from the calibration media source 302 to their respective print zones 306 and 304.

In one example, the calibration media may be narrower than the print media. For example, the width of the calibration media may, in one example, be in a range of about 2 to 20 cm. In other examples other widths of calibration media may be used. In one example the calibration media is supplied from the calibration media source in the form of a web or roll of calibration media.

Figure 4:
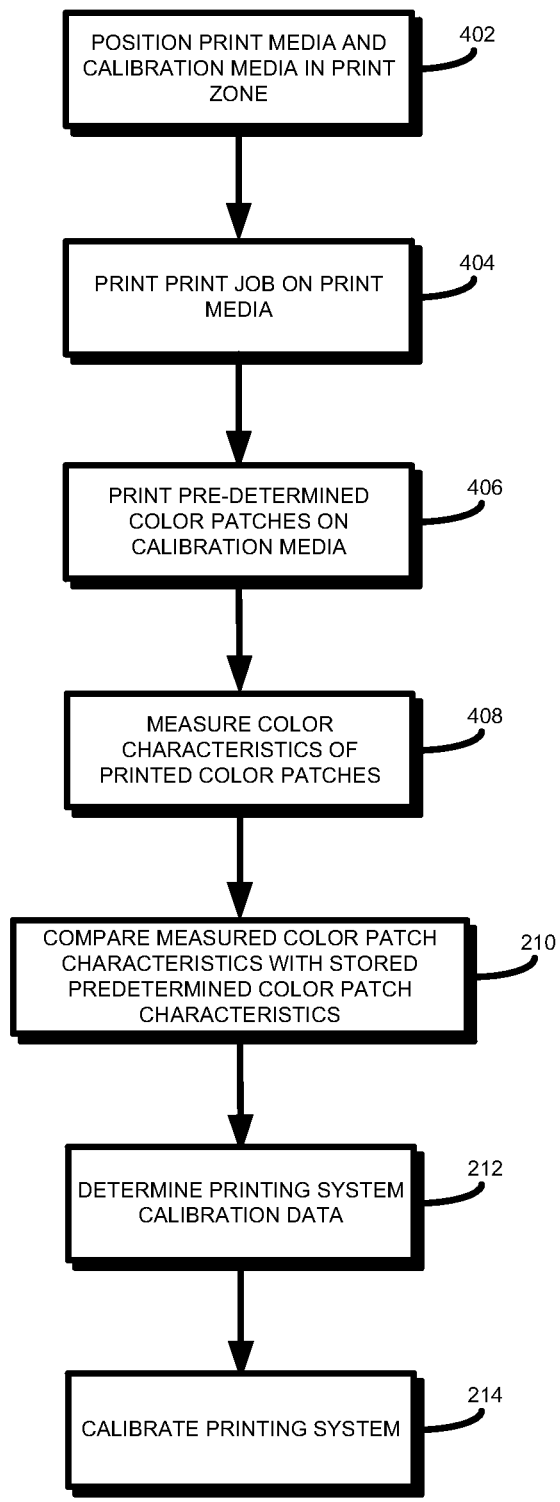
FIG. 4 is a flow diagram outlining an example method of operating elements of a printing system according to one example.

Operation of elements of the printing system 300 according to one example will now be described with further reference to the flow diagram of FIG. 4.

At block 402 the printer controller 120, in accordance with instructions 304 stored in the memory 124, controls elements of the printing system 300 to position print media from the print media source 114 in the print media print zone 306. The printer controller 120 also controls elements of the printing system 300 to position calibration media from the calibration media source 302 in the calibration print zone 304.

At block 404 the printer controller 120 controls the printing system 300 to print a print job on the print media in the print media print zone 306. The print job may, for example, be sent to the printing system 300 from a printer driver, a raster image processor, or any other suitable device or mechanism.

At block 406 the printer controller 120 controls the printing system 300 to print a set of predetermined color patches on calibration media in the calibration print zone 304. Since, in the present example, the print engine 102 is able to scan along the whole width of both the print media print zone 306 and the calibration print zone 304, the printing system 300 is able to print a swath of a print job on the print media in the same pass as it prints a swath of a predetermined set of color patches on calibration media in the calibration print zone 304.

At block 408 printer controller 120 controls the CMD 118 to measure color characteristics of each of the color patches printed on the calibration media 116. The printer controller 120 may achieve this, for example, by moving the CMD 118 across the width of the calibration print zone above a set of printed color patches, and by controlling the calibration media advance mechanism to position the calibration media in an appropriate position below the CMD 118.

In one example the printing system 300 includes a separate carriage bar and carriage on which is mounted the CMD 118. In this way, the printer controller 120 may control the position of the CMD 118 independently from the print engine 102.

The printer controller 120 stores, at least temporarily, in the memory 124, the measured color characteristics for each color patch.

At blocks 210, 212, and 214, the above-described operations are performed to compare measured color patch characteristics with stored predetermined color patch characteristics (block 210), to determine printing system calibration data (block 212), and to calibrate the printing system (block 214).

In this example, the printing system 100 may be calibrated using the calibration media 302 at any time, even during the printing of a print job on print media 114. In one example calibration is periodically performed using the calibration media 114. In another example, calibration may be performed continuously, or quasi-continuously, whilst print jobs are being printed on print media 114.

Figure 5:
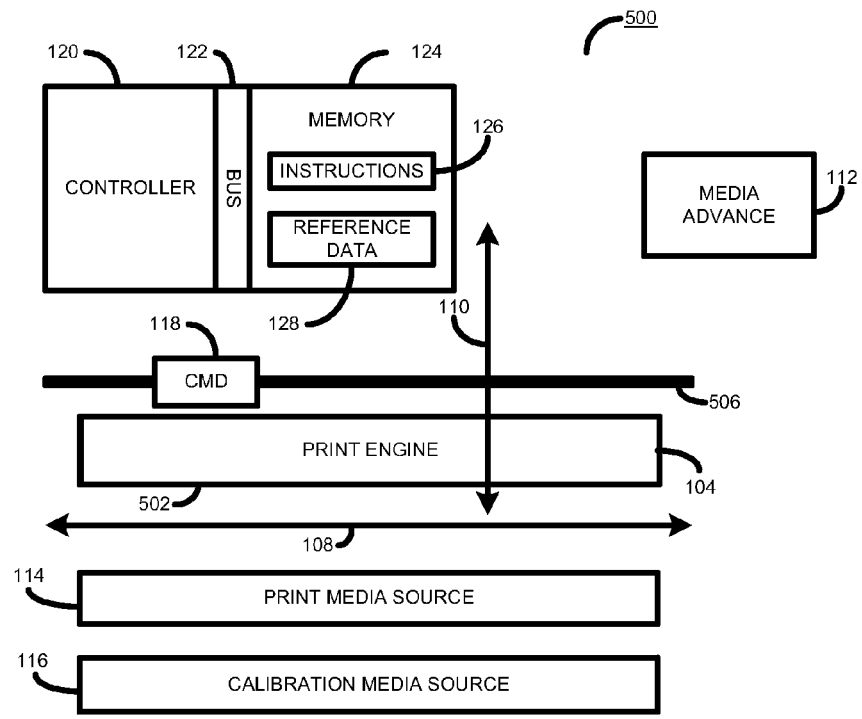
FIG. 5 is a simplified block diagram of a printing system according to one example.

A further example of a printing system 500 is shown in FIG. 5. The printing system 500 is similar in nature to the printing system 100 of FIG. 1, but comprises a print engine 502 that covers the entire print media print zone 306. In one example, the print engine 502 is a page-wide array configuration of inkjet printheads. In another example, the print engine 502 may be a laser print engine, a liquid electrophotgraphic (LEP) print engine, or any other suitable wide print engine.

In this example, since the print engine 502 does not scan across the print zone 504 the CMD 118 is mounted on a separate carriage and carriage bar 506 that enables the CMD 118 to move along the width of the print media print zone 306.

Figure 6:
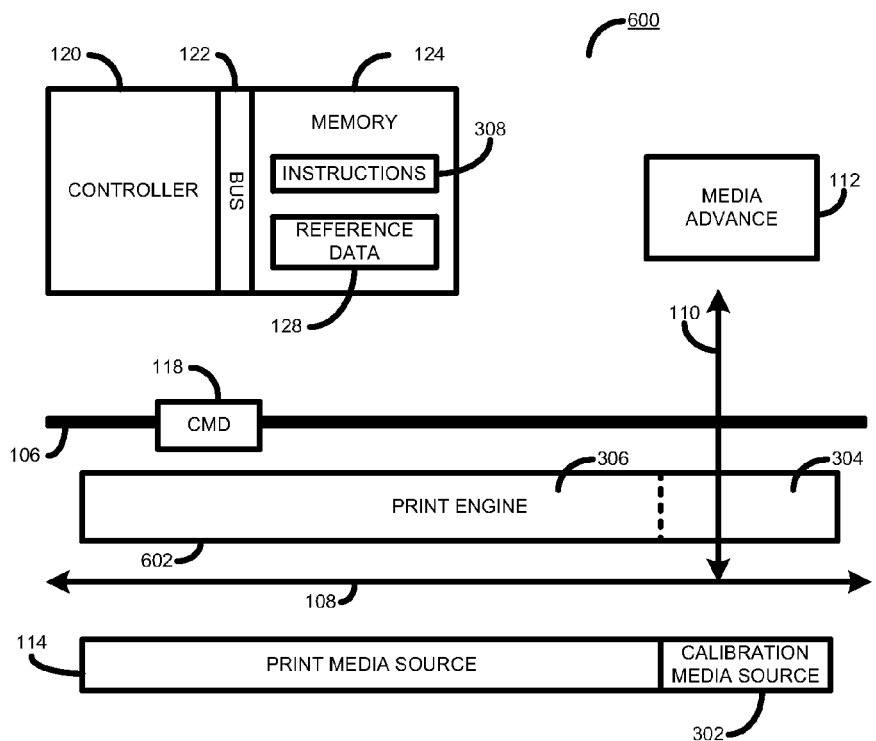
FIG. 6 is a simplified block diagram of a printing system according to one example.

A yet further example of a printing system 600 is shown in FIG. 6. The printing system 600 is similar in nature to the printing system 300 of FIG. 3, but comprises a print engine 602 that covers the entire print media print zone 306 and the entire calibration print zone 304. In one example, the print engine 502 is a page-wide array configuration of inkjet printheads. In another example, the print engine 502 may be a laser print engine, a liquid electrophotgraphic (LEP) print engine, or any other suitable wide print engine.

In this example, since the print engine 602 does not scan across the print zone 504 the CMD 118 is mounted on a separate carriage and carriage bar 506 that enables the CMD 118 to move along the width of the calibration print zone 304. In one example the CMD 118 is moveable across the width of both the print media print zone 306 and the calibration print zone 304.

In one example, the type of calibration that may be performed using the calibration media in accordance with the above-described examples is calibration for inkjet printhead nozzle drop-size variation. Fixed volume ink drops ejected from an inkjet printhead nozzle form different size ink spots on different media depending on characteristics of the media. Furthermore, in some printing systems the volume of ink drops ejected by inkjet printhead nozzles may vary over time. The amount of ink ejected onto a media may directly affect both measured and perceived color characteristics (such as optical density, brightness, etc.)

Using a calibration media having known media characteristics enables changes in eject drop volume to be characterized, for example in a one-dimensional table or array. Storing this reference calibration data in each printing system enables a printer controller, such as the printer controller 120, to subsequently perform a calibration operation on a calibration media having the same media characteristics as the reference media used to produce the stored reference calibration data. In this way, a printer controller may, at any time, perform a calibration operation and, in response thereto, modify parameters of a printing system to compensate for any drop-size variation. Consequently, performing such a calibration has benefits when printing on other print media.

In other examples, other types of calibration may be performed.

It will be appreciated that examples and embodiments of the present invention can be realized in the form of hardware, software or a combination of hardware and software. As described above, any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples of the present invention. Examples of the present invention may be conveyed electronically via any medium such as a communication signal carried over a wired or wireless connection and examples suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A printing system comprising:
    a print engine for printing on media in a print zone;
    a color measurement device;
    a print media source to supply print media to the print zone to enable the print engine to print a print job on a print media;
    a calibration media source to supply calibration media to the print zone; and
    a printer controller to control the printing system to:
        position a calibration media in the print zone;
        print a predetermined set of color patches on a calibration media;
        measure, using the color measurement device, color characteristics of a set of color patches printed on a calibration media;
        determine printing system calibration data by comparing the measured color characteristics with reference color characteristics stored in the printing system; and
        calibrate the printing system using the determined calibration data such that a print from said print engine is consistent with a further print from a different print engine.

2. The printing system of claim 1, wherein the printing system is configured to supply only one of print media and calibration media to the print zone at any one time.

3. The printing system of claim 1, wherein the print zone comprises a print media print zone and a calibration print zone, and wherein the printing system is configured to supply print media to the print media print zone and is configured to supply calibration media to the calibration print zone.

4. The printing system of claim 3, wherein the printer controller is configured to control the printer to print on print media in the print media print zone and to print on calibration media in the calibration print zone substantially concurrently.

5. The printing system of claim 4, wherein the calibration media source is configured to supply calibration media in the form of a web to the calibration print zone.

6. The printing system of claim 3, further comprising a first media advance mechanism for advancing the print media, and a second media advance mechanism for independently advancing the calibration media.

7. The printing system of claim 1, wherein the stored reference color characteristics are obtained from measuring color patches printed on a reference calibration media having predetermined characteristics.

8. The printing system of claim 7, wherein the controller is configured to control the printing system to print color patches and to measure color patches on calibration media having substantially the same predetermined characteristics as the reference calibration media.

9. The printing system of claim 1, wherein the determined calibration data is used to calibrate the printing system for inkjet printhead nozzle drop size variation.

10. The printing system of claim 1, wherein the print engine comprises at least one inkjet printhead.

11. The printing system of claim 1, wherein the color measurement device is mounted on a carriage bar and is movable over the print zone.

12. The printing system of claim 1, wherein the printing system stores only a single set of reference color characteristics.

13. A method of calibrating a printing system, the printing system configured to supply print media and calibration media to a print zone, the method comprising:
    controlling the printing system to position calibration media in the print zone;
    printing a predetermined set of color patches on the calibration media;
    measuring color characteristics of the printed set of color patches;
    comparing the measured color characteristics with a set of reference color characteristics, the set of reference color characteristics having been obtained from measurements of color patches printed on a reference calibration media having predetermined media characteristics; and
    calibrating the printing system based on the compared characteristics such that a print from a first print engine is consistent with a print from a different print engine.

14. The method of claim 13, further comprising supplying print media and calibration media to the print zone concurrently, and printing color patches on calibration media at substantially the same time as printing an image on print media.

15. The method of claim 14, further comprising performing the steps of measuring, comparing, and calibrating, whilst printing a print job on print media.

16. The method of claim 13, wherein the step of calibrating comprises calibrating the printing system to compensate for inkjet printhead nozzle drop size variation.

* * * * *